United States Patent
Beauregard et al.

[19]

[11] Patent Number: 5,997,224
[45] Date of Patent: Dec. 7, 1999

[54] KEY CUTTING MACHINE FOR CUTTING KEYS BY CODE

[75] Inventors: Alain Beauregard, Montreal; Aaron Fish, Hampstead, both of Canada

[73] Assignee: Ilco Unican, Inc., Quebec, Canada

[21] Appl. No.: 08/931,586

[22] Filed: Sep. 16, 1997

[51] Int. Cl.$^6$ ...................................................... B23C 1/16
[52] U.S. Cl. ............................................. 409/81; 409/110
[58] Field of Search .................................. 409/81, 83, 76, 409/110

[56] References Cited

U.S. PATENT DOCUMENTS

| | | |
|---|---|---|
| 3,865,011 | 2/1975 | Patriquin . |
| 4,898,504 | 2/1990 | Agius et al. ............................... 409/81 |
| 4,929,129 | 5/1990 | Dickson ..................................... 409/81 |
| 5,128,531 | 7/1992 | Fadel . |
| 5,259,708 | 11/1993 | Brice ........................................ 409/81 |
| 5,360,299 | 11/1994 | Oliana ....................................... 409/83 |
| 5,607,267 | 3/1997 | Heredia et al. ........................... 409/81 |
| 5,676,504 | 10/1997 | Mueller et al. ........................... 409/83 |
| 5,711,643 | 1/1998 | Parr et al. ................................. 409/83 |

*Primary Examiner*—Andrea L. Pitts
*Assistant Examiner*—Adesh Bhargava
*Attorney, Agent, or Firm*—Hill & Simpson

[57] ABSTRACT

A key cutting machine for cutting keys by code has a vise jaw for securely holding a key with a groove of the key aligned with respect to the vise jaw and with at least one of a tip of the key and a shoulder of the key positioned at a predetermined position with respect to the vise jaw, a key cutter, a position detector for detecting a blank edge of the key held by the vise jaw, a movement system for moving the key cutter and the vise jaw relative to one another to cut the key; and a controller for controlling the movement system to carry out a predetermined sequence of movements according to code information. The code information is referenced with respect to a blank edge of a side of the key to be cut, and the predetermined sequence of movements being referenced to the detected blank edge position. A key is cut with the key held in the vise jaw with a groove of the key aligned with respect to the vise jaw without needing to align the key with respect to a keyrest. For a double sided key having standard code information, the key is placed against a keyrest and the position detector is used to determined the width of the key. The second side of the key is then cut with the key held in the vise jaw with a groove of the key aligned with respect to the vise jaw without needing to align a remaining blank side with respect to a guide. For a double sided key having code information including a width parameter of the key blank, the key is placed against a keyrest and the position detector is used to determined the actual width of the key blank. The predetermined sequence of movements is then modified to compensate for differences in key blank width.

26 Claims, 3 Drawing Sheets

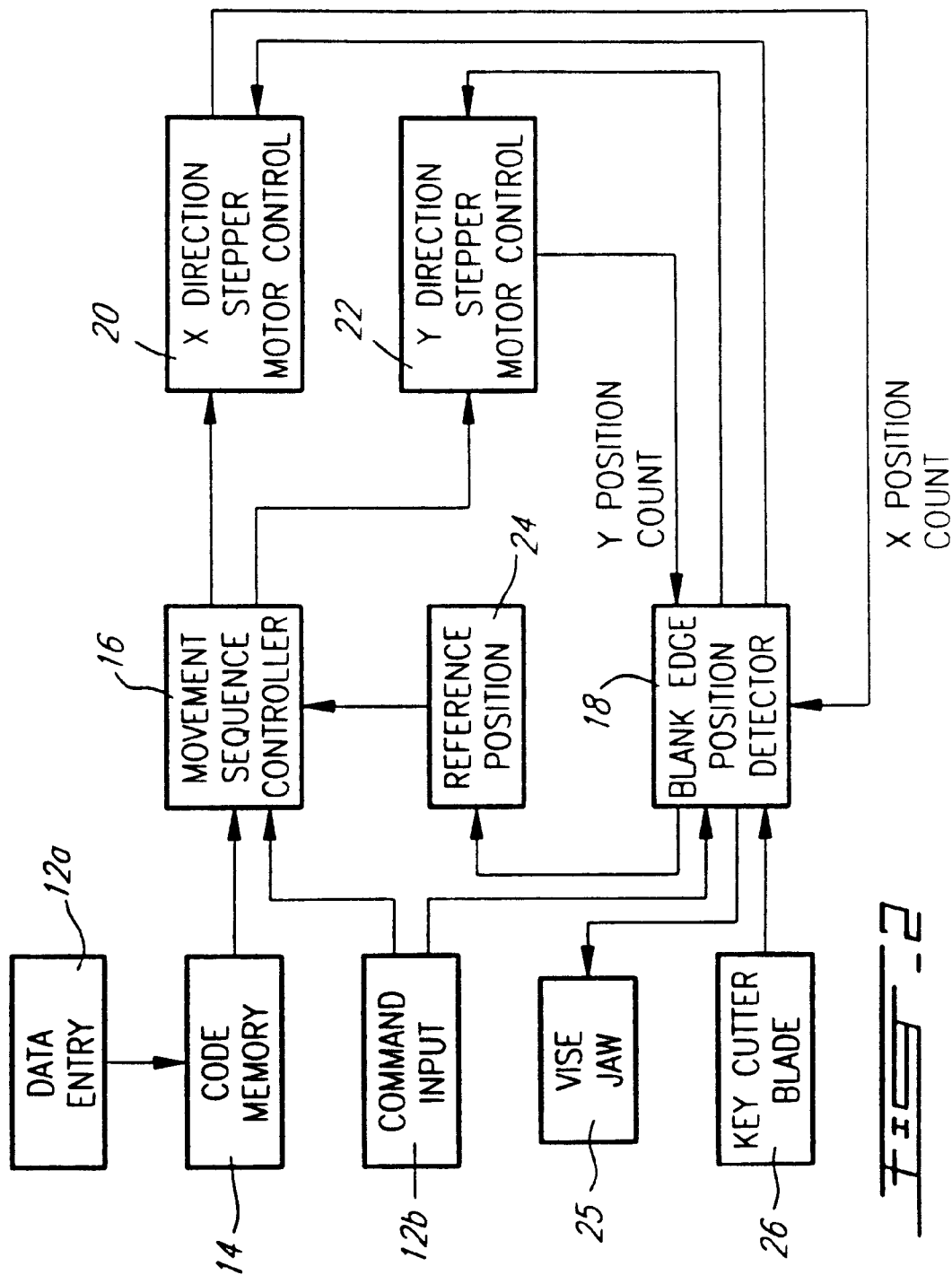

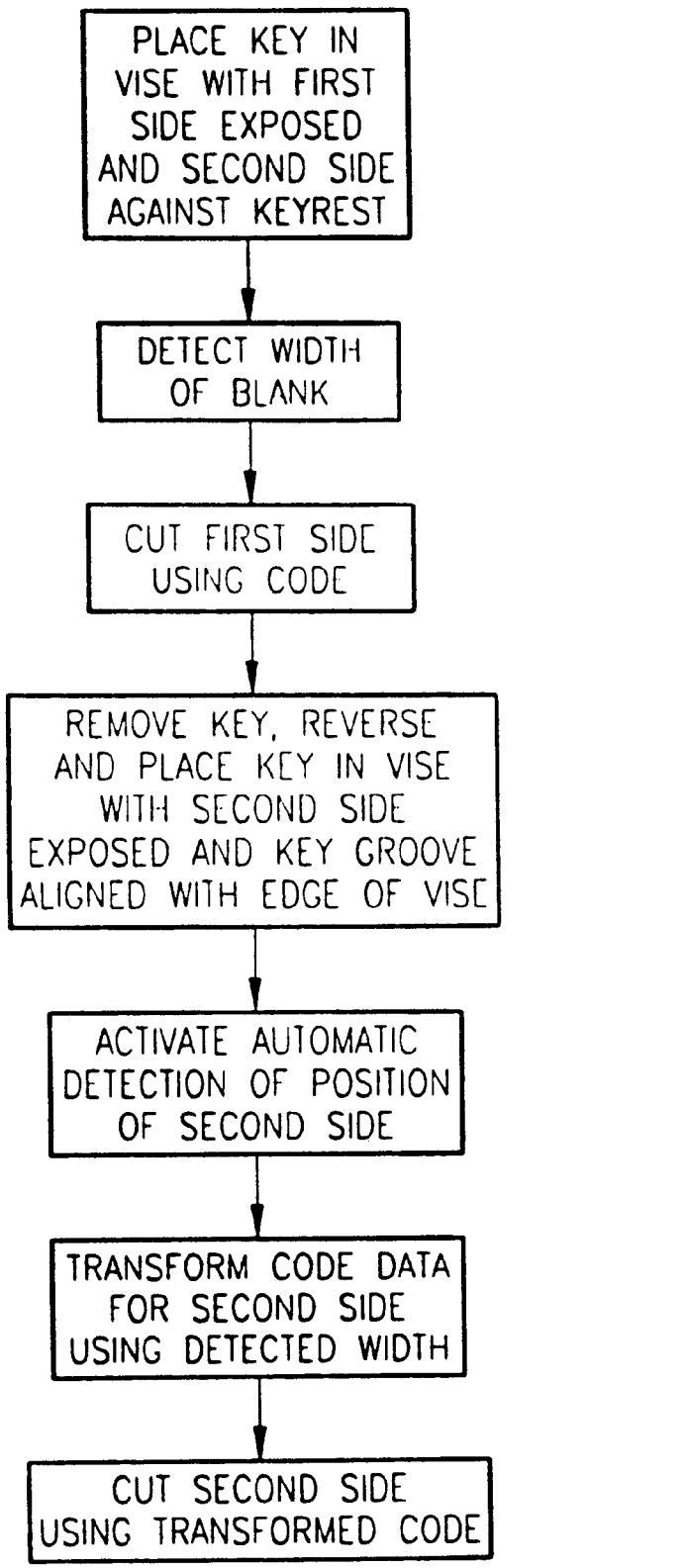

KEY CUTTING MACHINE FOR CUTTING KEYS BY CODE

FIELD OF THE INVENTION

The present invention relates to cutting keys by code.

BACKGROUND OF THE INVENTION

In conventional key duplicating machines, there are two methods for cutting new keys. The first method is to duplicate a key from a master key in which a guide is used to follow along the surface of the bitted edge of the master key with the movements of the guide being duplicated by a cutting tool cutting into a blank side edge of the key being cut. The master key and the key being cut are both held in key clamps or vice jaw with a shoulder of the key or a tip or nose of the key contacting an abutment and the key being clamped in alignment with the vice jaw. In order to place the key in alignment with the vice jaw, the heel or flat second side of a single-sided key is placed against a key rest both in the case of the master key and in the case of the key to be cut.

In the case of a double-sided key, the groove of the key (also known as the ward), is aligned with an edge of the vice jaw as the key is inserted into the vice jaw with the shoulder or tip positioned against an abutment in a fixed relation to the vice jaw. This is done both for the master key and for the key to be copied. In this way, the fixed relation between the follower guide, which follows the bitted edge of the master key, and the cutting tool results in an exact copy of the same bitted edge. It is also a relatively straightforward task for the operator to align each such key with the same groove edge aligned with respect to an edge of the vice jaw.

In the second method, a key is cut by code, and the exact shape of the key is not cut by following a master key, but rather by following a series of known dimensions describing the shape of the bitted edge which are used to program a predetermined sequence of movements to cut the blank edge of the key for use with a specific lock. When cutting a double-sided key using a coded cutting machine, it is conventionally necessary for the operator to carry out a preliminary position adjustment in order to bring the key as mounted in the vice jaw into a predetermined initial position which, in the case of a single-sided key, would have been determined by placing the key in abutment with the key rest. While such an alignment step is crucial, there exists no easy or automatic way to achieve it.

Standard key codes are referenced with respect to the blank edge opposite the side of the key to be cut, and not with respect to the surface of the blank edge to be cut. This means that the dimension of the bitted edge are not specified by the depths of the cuts to be made, but rather by the amount of key remaining uncut with respect to the opposite side. Such codes are well known in the art and typically comprise a series of precise values for each of the possible "depths" and spaces of the bitted edge of keys of the same series, and then the code for a particular key is merely a set of numbers referring to the particular depth selected for each position or space along the key side edge.

Positioning a key blank in the key cutting machine's vise jaw for a single sided key is a relatively easy task. The key blank is positioned with its side opposite the side to be cut against a keyrest having a known fixed position with respect to the vise jaw, and the key is cut according to the code. In the case of a double sided key, the second side to be cut needs to be placed in the vise jaw as if the first side were uncut and positioned against the keyrest. However, since the first side is already cut, another awkward guide needs to be used to set the key blank in the vise jaw so that it can be cut according to the code.

It is also known in the art to provide key cutting machinery which detects the placement of a key in a vice jaw or which detects a profile of the bitted edge held in the vice jaw. See, for example, U.S. Pat. No. 3,865,011 and U.S. Pat. No. 5,128,531.

SUMMARY OF THE INVENTION

It is an object of the present invention to provide a key cutting machine and method in which the key is held clamped in a vice jaw with a groove of the key aligned with respect to the vice jaw and with either the tip of the key or the shoulder of the key positioned at a predetermined position with respect to the vice jaw so that a blank side edge of the key held by the vice jaw can be cut taking into account the reference of the detected blank edge position.

According to a first aspect of the invention, it is possible to cut a key, for which either the width is known and standard code information is used or for which the code information is referenced with respect to a surface of the blank edge to be cut, by detecting a blank edge position of the key and without positioning the key against a keyrest.

According to a second aspect of the invention, it is possible to cut a double sided key, for which the width is known not part of the standard code information referenced with respect to a surface of the blank edge opposite the edge to be cut, by placing the one side of the key flushly against a keyrest, measuring the width of the key when cutting the other side by detecting the position of the blank edge of the key, and cutting the other side of the key, without placing the remaining blank side of the key against any keyrest or guide, by referencing movement with respect to a detected position of the blank edge of the other side and using the measured width to convert the standard code information into blank surface referenced information.

According to a third aspect of the invention, it is possible to cut a double sided key, for which the width is part of the code information, by placing the one side of the key flushly against a keyrest, measuring the actual width of the key blank, determining if there is a difference between the measured width and the stored width parameter of the code information and, if need be, adjusting the code information to compensate for the different key blank width before cutting each side of the key blank with reference to a detected surface position of each side of the key blank. The typical compensation would be one half of the difference in width, e.g. a blank which is 0.008" (0.20 mm) wider than normal needs to be cut 0.004" (0.10 mm) deeper than the code indicates with respect to its detected surface position.

Detection of the edge of the key is done automatically either by detecting electrical contact between a conductive cutting blade and the key or by detecting electrical contact between the key and a reference probe or alternatively by using an interruptible light beam or the like to determine an accurate estimate of the position of the key with respect to the vice jaw, and more specifically, with respect to a standard frame of reference.

The position of the blank edge of the key may be detected by detecting electrical contact between a conductive cutting blade and an electrically conducting key. The position of the blank edge of the key may also be detected by optical means, such as an interruptible beam, emitted from a light source and a corresponding photodetector arrangement, or using an imaging camera, or even an electro mechanical contact sensor mounted on the key cutting machine in such a way that the position of the position detecting means is well-referenced to the frame of reference of the cutting machine in order to detect the unknown position of the blank edge of the key held in the vice jaw. Preferably, the means for moving the key cutter in the vice jaw relative to one another consists of a stepper motor mobile platform on which the vice jaw is mobile and the key cutter is a rotary grinding wheel mounted in a fixed position on the cutting machine. While the invention is preferably used for cutting double-sided keys, it will be appreciated that the invention may be used for detecting the position of a key held in a vice jaw for other types of key cutting situations.

The invention provides a key cutting machine for cutting keys by code comprising: a vise jaw for securely holding a key with a groove of the key aligned with respect to the vise jaw and with at least one of a tip of the key and a shoulder of the key positioned at a predetermined position with respect to the vise jaw; a key 15 cutter; means for detecting a position of a blank edge of the key held by the vise jaw with respect to the key cutter; means for moving the key cutter and the vise jaw relative to one another to cut the key; and control means for controlling the moving means to carry out a predetermined sequence of movements according to code information, the code information being referenced with respect to a blank edge of a side of the key to be cut, and the predetermined sequence of movements being referenced to the detected blank edge position. In this way, a key can be cut with the key held in the vise jaw with a groove of the key aligned with respect to the vise jaw without needing to align the key with respect to a keyrest.

The invention also provides a key cutting machine for cutting double sided keys by code comprising: a vise jaw for securely holding a key with a groove of the key aligned with respect to the vise jaw and with at least one of a tip of the key and a shoulder of the key positioned at a predetermined position with respect to the vise jaw, the vise jaw including a keyrest having a fixed known position for flushly receiving a first blank side of the key; a key cutter; means for detecting a position of a blank edge of an exposed second blank side of the key held by the vise jaw with the first blank side abutting the keyrest and for determining a width of the key; means for detecting a position of a blank edge of the first blank side of the key held by the vise jaw to be exposed, the second blank side being already cut and not flushly abutting the keyrest; means for moving the key cutter and the vise jaw relative to one another to cut the key; and control means for controlling the moving means according to code information, the code information being referenced with respect to an opposite blank side of the key and not including a width parameter of the key blank, to carry out a first predetermined sequence of movements to cut the blank edge of the second side of the key using the code information directly, and then to cut the blank edge of the first side of the key according to a second predetermined sequence of movements, the second predetermined sequence of movements being referenced with respect to the detected first side blank edge position and determined using the code information and the measured width to reference the second predetermined sequence of movements with respect to the blank edge of the first side of the key. In this way, a double sided key can be cut with the key held in the vise jaw with a groove of the key aligned with respect to the vise jaw without needing to align a remaining blank side with respect to a guide.

The invention further provides a key cutting machine for cutting double sided keys by code comprising: a vise jaw for securely holding a key with a groove of the key aligned with respect to the vise jaw and with at least one of a tip of the key and a shoulder of the key positioned at a predetermined position with respect to the vise jaw, the vise jaw including a keyrest having a fixed known position for flushly receiving a first blank side of the key; a key cutter; means for detecting a position of a blank edge of an exposed second blank side of the key held by the vise jaw and for determining a width of the key; means for detecting a position of a blank edge of the first blank side of the key held by the vise jaw to be exposed with the second blank side already cut and not flushly abutting the keyrest; means for moving the key cutter and the vise jaw relative to one another according to cut the key; and control means for controlling the moving means according to code information referenced with respect to an opposite blank side of the key, the code information including a width parameter of the key blank, to carry out a predetermined sequence of movements to cut the blank edge of each of the first and second sides of the key referenced with respect to the detected position of the blank edge of the first and second sides respectively and using the code information modified by a function of a difference between the measured width and the width parameter of the code information. In this way, a double sided key is cut using code information including a normal width parameter while compensating for differences in width of key blanks.

BRIEF DESCRIPTION OF THE DRAWINGS

The invention will be better understood by way of the following detailed description of a preferred embodiment with reference to the appended drawings, in which:

FIG. 2 is a schematic block diagram of the electronic control system according to the preferred embodiment; and FIG. 3 is a method block diagram aligning the steps involved in the preferred embodiment of the invention.

DETAILED DESCRIPTION OF THE PREFERRED EMBODIMENTS

Figure 1:
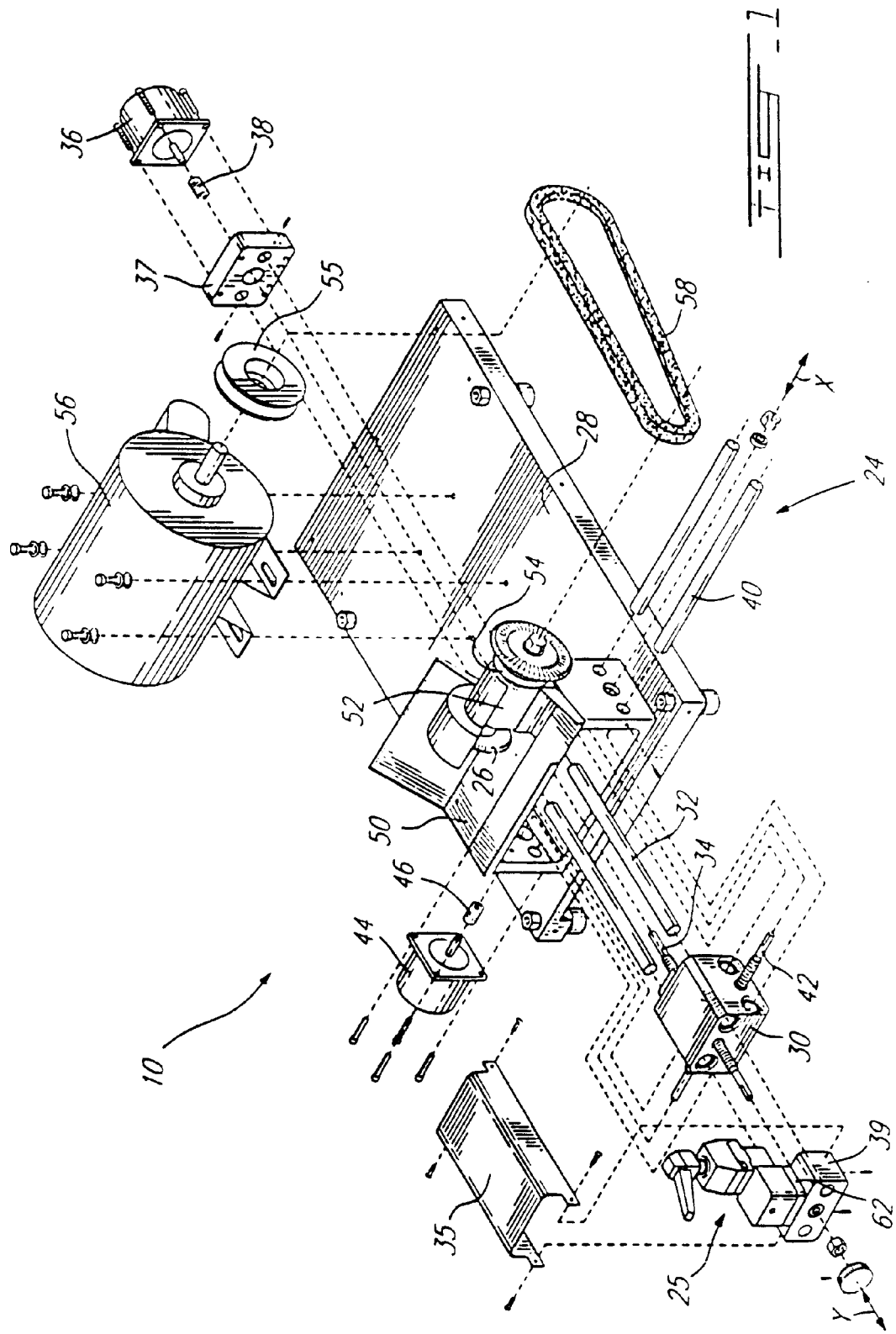
FIG. 1 is an exploded view of the key cutting machine according to the preferred embodiment.

As illustrated in FIG. 1, the key cutting machine 10 comprises a key clamping vice jaw 25 and a first key cutting rotary blade 26. A movable block 30 is movable in the X direction to move the key from the shoulder to the tip with respect to the cutting blade. The block 30 is mounted on a pair of smooth shafts 40 and displaced by a feed screw 42 driven by a stepper motor 44 connected to the shaft 42 via a flex coupling 46. As the block 30 is moved in the X direction, the stepper motor 36 and its associated smooth shafts 32 move from side to side.

The displacement in the Y direction of the vice jaw 25 results from movement of the smooth shafts 32 in the Y direction as the threaded shaft 34 is rotated by the motor 36. With the block 30 remaining fixed in a single Y position, the motor 36 mounted to the mounting plate 37 is connected to one end of the smooth shaft 32 via a flexible coupler 38 while the base 39 of the vice jaw is connected to an opposite end of the smooth shafts 32. For safety, improved appearance and to reduce dust, a cover 35 is connected between the base of the vice jaw 39 and the stepper motor mounting plate 37 and dimensioned to fit over the block 30 and the threaded shaft 42.

A U-shaped mounting plate 50 supports a bearing 52 for the rotary blade 26 which is used for cutting bitted edges having finer features. The rotary shaft on which the cutting blade 26 is mounted is provided with a drive belt pulley wheel 54 and a motor 56 drives a driving belt pulley wheel 55 with a drive belt 58 interconnecting the belt pulley wheels 54 and 55.

In the drawing of FIG. 1, the control electronics are not illustrated. With reference to FIG. 2, the control electronics of the preferred embodiment will be described. A data entry device 12a, such as a keyboard or keypad, is provided for entering or selecting code specifications. The code specifications are stored in a code memory 14, the contents of which are at least in part made available to a movement sequence controller 16. Based on a command input from an input device 12b, the movement sequence controller carries out a predetermined sequence of movements to cut the blank edge of the key held in the vice jaw 25 for use with a particular lock. The movement sequence controller 16 communicates with X and Y stepper motor control devices 20 and 22 to carry out this very function.

A command input from command input device 12b is entered to signal the detection of the key position in the vice jaw 25. A blank edge position detector 18 then causes the X direction stepper motor control to move to a predetermined position and then causes the Y direction stepper motor control 22 to move the cutting blade 26 into an initial contact with the key held in the vice jaw 25.

The vice jaw 25 is electrically insulated via a plastic spacer 62 and an electrical current is supplied to the vice jaw 25 (via a wire not shown) which is conductive and in electrical contact with the conductive key. As soon as current passes through the key to the key cutter blade 26, a contact output signal is generated and the blank edge position detector 18 stops the Y direction stepper motor control from advancing the cutter blade. In the preferred embodiment, the blade 26 is grounded either through the bearings in the bearing 52 if conductive (conductive lubricant may be required) or through a slip ring. The detector 18 reads the position count values for each motor and outputs a position value of the blank edge of the second side of the key to a reference position memory 24 which is readable by controller 16. Controller 16 includes a store of a position of the keyrest so that detecting the key blank position held by the jaw 25 with an opposite side of the key blank abutting the keyrest can give a measurement of the width of the key blank.

In the preferred embodiment, the key cutting machine cuts double sided keys from code information which is referenced with respect to a surface of the blank edge opposite the edge to be cut. This method is illustrated in FIG. 3. The one side of the key is placed flushly against a keyrest, in vise jaw 25 with either the shoulder or the tip positioned in a predetermined position (for which a guide may be used, as is known in the art). In response to command input 12b, the detector 18 determines the position of the blank edge of the other side and outputs the position to memory 24. Controller 16 calculates the width of the key blank based on the stored value for the position of the keyrest, and controller 16 stores the width value in memory. Controller 16 then carries out the first predetermined sequence of movements to cut the other side (the first cut side) of the key based on the code information. Since the key is positioned against the keyrest, the code information is used directly. After the first side is cut, the key blank is removed from the jaw 25 and reversed without placing the remaining blank side of the key against any keyrest or guide. The key is simply placed in the jaw 25 with a groove of the key aligned with respect to the jaw 25. The operator then presses a key on the command input 12b to signal that the key has been properly placed in the vise jaw 25 and that the second side is ready to be cut. Detector 18 then moves the cutting blade into an initial position until contact between the blade and the blank is made, and stores the reference position in memory 24. When the new position for the surface of the second side of the key blank is known, controller 16 calculates the sequence of movements for cutting the second side using the standard code information (itself referenced to a baseline which would be the opposite blank side, now the cut first side) and the previously determined width of the blank. The sequence of movements will thus be referenced with respect to the detected blank surface position of the second side.

The code information may be input using a keypad and/or key code information for a large number of standard types of keys may be stored in memory. For input using a keypad, the code information is usually found in a code book, such as the Reed code book. The depth information given in such a code book is the amount of material that should not be removed (i.e. referenced with respect to the keyrest). This means that to get an accurate cut, it is necessary to position the key such that the side of the key that will not get cut is at a known location relative to the cutter. That is, one must know the distance between the cutter and the second (far) side of the key blank, $\gamma_o$.

When cutting the first side of the key, the value of $\gamma_o$ can easily be obtained if one knows the distance between the keyrest (inside the jaw) and the cutter and if the key is positioned in the jaw so that the side that will not be cut is aligned on the keyrest.

When cutting the second side, however, it might not be possible to use this method to obtain $\gamma_o$ depending on how much material was removed. In this case, the following method is carried out. The proper measurements for the depths and spaces of the bitten edge features are obtained. The machine is calibrated such that the distance between keyrest and cutter ($\gamma_o$) is known. The key is positioned in the jaw so that it rests on the keyrest. The distance between the cutter and the side of the key that will not be cut is $\gamma_o$. The cutter motor is turned on. The key is moved towards the cutter until there is contact between the key and the cutter. The distance from the keyrest to the cutter ($w_1$) is recorded. This distance is the width of the key. The first side of the key is cut using known depths and spaces information. For example, to cut a key to a "depth" of 0.265" the jaw (or cutter) is moved so that the key is 0.265" away from the cutter. The key is moved $\gamma_o$ −0.365" towards the cutter. The jaw is then returned to its initial position. The key is turned over and the key is positioned in the jaw. This time, the key does not need to be pushed against the keyrest. The key only needs to be held in a position parallel to the jawrest. Typically, it can be aligned using a groove in the key. Next, the key is moved towards the cutter until there is contact between the key and the cutter. The distance from the keyrest to the cutter ($w_2$) is recorded. The difference ($w_2-w_1$) is the offset of the key from the keyrest. The second side of the key is cut using the offset to compensate for the new position of the key.

If the width of the key is known, both sides of the key can be cut without needing to align the key on the keyrest since the value $w_1$ is already known.

In an alternative embodiment, the key cutting machine cuts keys from code information which is referenced with respect to a surface of the blank edge to be cut. The key to be cut is placed in vise jaw 25 with either the shoulder or the tip positioned in a predetermined position (for which a guide may be used, as is known in the art). The groove of the key is placed aligned with respect to the vise jaw 25, but it is not necessary to abut an opposite rear side of the key blank against a keyrest. In response to command input 12b, the detector 18 determines the position of the blank edge of the other side and outputs the position to memory 24. Controller 16 then obtains position data for the predetermined sequence of movements to cut the key according to the code information. The position data is referenced with respect to the detected position of the blank edge. Controller 16 then carries out the predetermined sequence of movements to cut one side of the key. The key may be reversed to cut the opposite side, if the key is a double sided key. As can be appreciated, in this alternative embodiment, the code information must include a parameter for the key blank width, either implicitly by providing information referenced to the surface of the side of the key blank to be cut, or explicitly by providing information referenced to the opposite surface to the side of the key blank to be cut, along with an exact width parameter. It is possible that a key blank made by different manufacturers for the same lock have slightly different standard widths, and therefore the width parameter could be dependent on the blank used.

In another alternative embodiment, the key cutting machine cuts double sided keys from code information which includes a width parameter for the key blank to be cut. The one side of the key is placed flushly against a keyrest, in vise jaw 25 with either the shoulder or the tip positioned in a predetermined position (for which a guide may be used, as is known in the art). In response to command input 12b, the detector 18 determines the position of the blank edge of the other side and outputs the position to memory 24. Controller 16 calculates the width of the key blank based on the stored value for the position of the keyrest, and controller 16 stores the width value in memory. At this point, the controller 16 compares the width value of the key as measured to the width parameter from the code information. If the width of the key blank is greater or lesser than the standard width from the code information, the predetermined sequence of movements (as referenced with respect to the surface of the side of the key to be cut) are increased or decreased respectively by half of the difference between the measured width and the standard width. Controller 16 then carries out the modified first predetermined sequence of movements to cut the first side of the key based on the code information. After the first side is cut, the key blank is removed from the jaw 25 and reversed without placing the remaining blank side of the key against any keyrest or guide. The key is simply placed in the jaw 25 with a groove of the key aligned with respect to the jaw 25. The operator then presses a key on the command input 12b to signal that the key has been properly placed in the vise jaw 25 and that the second side is ready to be cut. Detector 18 then moves the cutting blade into an initial position until contact between the blade and the blank is made, and stores the reference position in memory 24. When the new position for the surface of the second side of the key blank is known, controller 16 calculates the second sequence of movements for cutting the second side using the code information. The second sequence of movements is modified in the same way that the first sequence is modified according to the difference between the measured width and the standard width of the key blank. Controller 16 then carries out the modified second predetermined sequence of movements to cut the second side of the key based on the code information.

Although the invention has been described above with respect to particular embodiments, it will be understood that many variations are possible within the scope of the present invention. A number of non-limiting examples of some variants are as follows. The part of the vice jaw which contacts the conductive key could be made itself from an electrically insulating material and a wire contact could be easily attached to the shoulder end of the key as a variant to providing an insulating spacer in the base of the vice jaw 25. Alternatively, the mounting for the cutting tool 52 could be electrically insulated and the vice jaw could be grounded. In the case that an interruptable light beam were to be used to detect the blank edge of the uncut side of the key, the light beam could be placed near to and in front of the cutter blade 26 such that the position can be detected within a limited range of movement of the vice jaw without any danger of making contact with the cutter 26.

We claim as our invention:

1. A key cutting machine for cutting an edge of a key by a code comprising:

a key holder and a key cutter positioned at a variable distance between each other;

a driver engaged with at least one of the key holder and the key cutter, and having a driver input;

a key detector positioned in key edge sensing relationship with the edge of the key and directly sensing the edge of the key when the key is in the key holder, the key detector having a key detector output and a key position signal indicative of the position of the key; and a controller having a controller input connected to the key detector output and a controller output connected to the driver input;

wherein the controller input receives the key position signal from the key detector output and sends a driver control signal from the controller output to the driver input based on the key position signal and the code.

2. The key cutting machine of claim 1 in which the key has a groove and at least one of a tip and a shoulder, wherein the groove of the key is aligned with the key holder and at least one of the tip and the shoulder is positioned at a predetermined location on the key holder when the key is in the key holder.

3. The key cutting machine of claim 1 in which the key is held in the key holder without abutting an opposite edge of the key to the edge being cut against a keyrest on the key holder.

4. The key cutting machine of claim 1 wherein the key detector comprises an electrical circuit in which the key cutter and the key are electrically connected together.

5. The key cutting machine of claim 4 wherein the key cutter has a cutting blade which contacts the edge of the key to electrically connect the key cutter and the key together.

6. The key cutting machine of claim 4 wherein the electrical circuit is electrically connected to the key holder and the key holder is electrically connected to the key when the key is held in the key holder.

7. The key cutting machine of claim 1 wherein the key cutter is in a stationary position and the driver drives the key holder with respect to the key cutter.

8. The key cutting machine of claim 7 further comprising a pair of stepper motors, each stepper motor coupled to the key holder such that each stepper motor drives the key holder in one of an X-direction and a Y-direction.

9. The key cutting machine of claim 1 further comprising:

a pair of stepper motors, each stepper motor coupled to the key holder such that each stepper motor drives the key holder in separate directions; and a stepper motor controller connected to the pair of stepper motors and the controller.

10. The key cutting machine of claim 1 further comprising an input device connected to the controller.

11. A key cutting machine for cutting a double sided key having first and second sides and a width by a code comprising:
   a key holder having a keyrest;
   a cutter positioned at a variable distance from the key holder;
   a driver in driving engagement with at least one of the cutter and the key holder, wherein the key and the cutter can be moved into contact with each other;
   a detector positioned in key sensing relationship with the key and directly sensing the key when the key is held in the key holder, the key detector having a detector output, a second key side signal indicative of a position of the key to be cut when the first side is received by the keyrest and a first key side signal indicative of a position of the key to be cut when the key is held in the key holder without the keyrest receiving the second side; and
   a controller having a controller input connected to the detector output and a controller output connected to the driver; wherein the controller input receives the first and second key side signals from the detector output and sends a driver control signal from the controller output to the driver based on the positions of the first and second sides of the key, the width of the key and the code.

12. The key cutting machine of claim 11 wherein the keyrest has a known keyrest position such that the width of the key is defined by a distance between the known keyrest position and the second side of the key when the first side of the key is received by the keyrest.

13. The key cutting machine of claim 11 in which the code for cutting the key references an opposite side of the key from a side being cut and is absent of the width of the key;
   wherein the driver control signal has a first sequence of movement for the one of the cutter and the key holder based on the position of the second side, a known position of the keyrest and the code referencing the first side when the first side of the key is received in the keyrest; and
   wherein the driver control signal has a second sequence of movements for the one of the cutter and the key holder based on the position of the first side of the key, the width of the key and the code referencing the second side when the second side of the key is held in the key holder without being received in the keyrest.

14. The key cutting machine of claim 11 in which the key has a groove and at least one of a tip and a shoulder, wherein the groove of the key is aligned with the key holder and at least one of the tip and the shoulder is positioned at a predetermined location on the key holder when the key is in the key holder.

15. The key cutting machine of claim 11 wherein the cutter is in cutting contact with the second side of the key when the first side is received by the keyrest and the cutter is in cutting contact with the first side of the key when the key is held in the key holder without the keyrest receiving the second side of the key.

16. The key cutting machine of claim 11 wherein the detector comprises an electrical circuit in which the cutter and the key are electrically connected together.

17. The key cutting machine of claim 16 wherein the cutter has a cutting blade which contacts the first and second sides of the key to electrically connect the cutter and the key together.

18. The key cutting machine of claim 16 wherein the electrical circuit is electrically connected to the key holder and the key holder is electrically connected to the key when the key is held in the key holder.

19. The key cutting machine of claim 11 wherein the cutter is in a stationary position and the driver is in driving engagement with the key holder.

20. The key cutting machine of claim 19 further comprising a pair of stepper motors, each stepper motor coupled to the key holder such that each stepper motor drives the key holder in one of an X-direction and a Y-direction.

21. The key cutting machine of claim 11 further comprising:
   a pair of stepper motors, each stepper motor coupled to the key holder such that each stepper motor drives the key holder in separate directions; and
   a stepper motor controller connected to the pair of stepper motors and the controller.

22. The key cutting machine of claim 11 further comprising an input device connected to the controller.

23. The key cutting machine of claim 11 in which the code has a key width parameter, and wherein the keyrest has a known keyrest position and an actual width of the key is defined by the known keyrest position and the position of the second side of the key when the first side is received in the keyrest, and wherein the controller controls the driver based on a comparison of the key width parameter to the actual width of the key.

24. The key cutting machine of claim 11 in which the code has a key width parameter, and wherein the controller controls the driver based on a comparison of the key width parameter to an actual width of the key.

25. A method of cutting a key having first and second edges using a code comprising the steps of:
   holding the key in a key holder such that the first edge is exposed for cutting and the second edge is spaced away from a keyrest on the key holder;
   directly detecting a position of the first edge of the key with a key detector;
   providing a signal which represents the position of the key from the key detector to a controller;
   determining a cutting sequence in the controller based on the signal and the code; and
   cutting the first edge by varying a distance between the key holder and the key cutter according to the cutting sequence.

26. The method of claim 25 further comprising the subsequent steps of:
   holding the key in the key holder such that the second edge is exposed for cutting and the first edge is spaced away from the keyrest on the key holder;
   detecting a position of the second edge relative to the key cutter;
   providing a second edge signal which represents the position of the key to the controller;
   determining a second edge cutting sequence in the controller based on the second edge signal and the code; and
   cutting the second edge by varying a distance between the key holder and the key cutter according to the second edge cutting sequence.

* * * * *